US011975877B2

(12) United States Patent
Fox

(10) Patent No.: US 11,975,877 B2
(45) Date of Patent: May 7, 2024

(54) CASE FORMER WITH CASE-SQUARING ASSEMBLY

(71) Applicant: Signode Industrial Group LLC, Tampa, FL (US)

(72) Inventor: Bryce J. Fox, Honesdale, PA (US)

(73) Assignee: Signode Industrial Group LLC, Tampa, FL (US)

(*) Notice: Subject to any disclaimer, the term of this patent is extended or adjusted under 35 U.S.C. 154(b) by 57 days.

(21) Appl. No.: 17/654,494

(22) Filed: Mar. 11, 2022

(65) Prior Publication Data

US 2022/0194643 A1 Jun. 23, 2022

Related U.S. Application Data

(63) Continuation of application No. 16/525,139, filed on Jul. 29, 2019, now Pat. No. 11,273,939.

(60) Provisional application No. 62/714,268, filed on Aug. 3, 2018.

(51) Int. Cl.

| | |
|---|---|
| ***B65B 43/26*** | (2006.01) |
| ***B31B 50/02*** | (2017.01) |
| ***B31B 50/26*** | (2017.01) |
| ***B31B 50/62*** | (2017.01) |
| ***B65B 43/10*** | (2006.01) |

(52) U.S. Cl.
CPC ............ *B65B 43/265* (2013.01); *B31B 50/02* (2017.08); *B31B 50/262* (2017.08); *B31B 50/62* (2017.08); *B65B 43/10* (2013.01)

(58) Field of Classification Search
CPC ........ B65B 43/265; B31B 50/02; B31B 50/62
See application file for complete search history.

(56) References Cited

U.S. PATENT DOCUMENTS

| | | | | |
|---|---|---|---|---|
| 1,352,899 A | | 9/1920 | Johnson | |
| 1,779,985 A | | 10/1930 | Schroeder | |
| 2,691,260 A | | 10/1954 | Schlemmer | |
| 2,804,738 A | | 9/1957 | Shenigo | |
| 3,267,640 A | | 8/1966 | Romney et al. | |
| 3,374,604 A | | 3/1968 | Roesner et al. | |
| 3,477,349 A | * | 11/1969 | Berney | B65B 43/265 493/181 |
| 3,716,962 A | | 2/1973 | Topler et al. | |
| 3,769,777 A | | 11/1973 | Freakes et al. | |
| 3,775,937 A | | 12/1973 | Devan et al. | |

(Continued)

OTHER PUBLICATIONS

"Case Sealer Uniform Legend", Little David, Case Sealing for the Real World (2 pages), 2004.

(Continued)

*Primary Examiner* — Andrew M Tecco
*Assistant Examiner* — Nicholas E Igbokwe
(74) *Attorney, Agent, or Firm* — Neal, Gerber & Eisenberg LLP

(57) ABSTRACT

Various embodiments of the present disclosure provide a case former configured to receive a case in a blank configuration, open the case into a tubular configuration, fold the lower minor flaps to manipulate the case into a partially closed-bottom configuration, square the case while in the partially closed-bottom configuration, and fold and tape the lower major flaps shut to manipulate the case into a closed-bottom configuration. The squaring step ensures that the case has a rectangular cross-section after taping rather than a rhomboid cross-section.

26 Claims, 10 Drawing Sheets

(56) References Cited

U.S. PATENT DOCUMENTS

| | | | |
|---|---|---|---|
| 3,959,950 A | 6/1976 | Fukuda | |
| 3,973,375 A | 8/1976 | Loveland | |
| 4,010,597 A | 3/1977 | Nelson | |
| 4,063,403 A | 12/1977 | Bergstein et al. | |
| 4,079,577 A | 3/1978 | Ulrich et al. | |
| 4,213,285 A | 7/1980 | Mancini | |
| 4,233,798 A | 11/1980 | Helding | |
| 4,293,086 A | 10/1981 | Fincher et al. | |
| 4,317,319 A | 3/1982 | Price | |
| 4,422,282 A | 12/1983 | Marchetti | |
| 4,478,023 A | 10/1984 | Becker | |
| 4,517,784 A | 5/1985 | Beckett | |
| 4,524,560 A | 6/1985 | Goodman | |
| 4,543,767 A | 10/1985 | Wiseman | |
| 4,545,175 A | 10/1985 | Beckett | |
| 4,553,954 A | 11/1985 | Sewell et al. | |
| 4,562,686 A | 1/1986 | Focke | |
| 4,565,050 A | 1/1986 | Norris | |
| 4,642,966 A | 2/1987 | Marchetti | |
| 4,722,165 A | 2/1988 | Marchetti | |
| 4,778,554 A | 10/1988 | Doman | |
| 4,781,786 A | 11/1988 | Lerner et al. | |
| 4,955,177 A | 9/1990 | Lerner et al. | |
| 4,972,654 A | 11/1990 | Marchetti | |
| 4,984,409 A | 1/1991 | Focke | |
| 5,022,214 A | 6/1991 | Kim | |
| 5,063,726 A | 11/1991 | Boisseau | |
| 5,102,382 A | 4/1992 | Center et al. | |
| 5,255,490 A | 10/1993 | Chiu | |
| 5,323,586 A | 6/1994 | Lissoni et al. | |
| 5,341,626 A | 8/1994 | Beckmann | |
| 5,454,776 A | 10/1995 | Ulrich et al. | |
| 5,685,814 A | 11/1997 | Le | |
| 6,067,773 A | 5/2000 | Le | |
| 6,070,396 A | 6/2000 | Rinaldi et al. | |
| 6,318,049 B1 | 11/2001 | Raudat et al. | |
| 6,319,183 B1 | 11/2001 | Ballos | |
| 6,669,616 B1 | 12/2003 | Bierenacki et al. | |
| 6,725,629 B2 | 4/2004 | Pearce et al. | |
| 6,910,314 B2 | 6/2005 | Le | |
| 7,140,165 B2 | 11/2006 | Ventura et al. | |
| 7,269,933 B2 | 9/2007 | Le | |
| 7,278,248 B2 | 10/2007 | Vinh | |
| 7,331,916 B2 | 2/2008 | Fox | |
| 7,828,708 B2 * | 11/2010 | Huang | B65B 43/265 493/70 |
| 7,886,503 B2 | 2/2011 | Chase et al. | |
| 8,109,062 B2 | 2/2012 | Chase et al. | |
| 8,128,547 B2 * | 3/2012 | Graham | B31B 50/78 53/381.1 |
| 9,630,796 B2 | 4/2017 | Menta et al. | |
| 2002/0170271 A1 | 11/2002 | Pearce et al. | |
| 2003/0040413 A1 | 2/2003 | Malecki et al. | |
| 2004/0068956 A1 | 4/2004 | Hartness et al. | |
| 2004/0093829 A1 | 5/2004 | Marchetti | |
| 2004/0226268 A1 | 11/2004 | Vinh | |
| 2005/0235603 A1 | 10/2005 | Le | |
| 2008/0127613 A1 | 6/2008 | Ware et al. | |
| 2009/0093355 A1 | 4/2009 | Huang et al. | |
| 2009/0239726 A1 * | 9/2009 | Huang | B31B 50/787 493/309 |
| 2014/0179501 A1 * | 6/2014 | Akama | B31B 50/262 493/162 |
| 2015/0027086 A1 | 1/2015 | Adams | |
| 2015/0291295 A1 * | 10/2015 | Langen | B65B 5/06 53/376.4 |
| 2015/0324893 A1 * | 11/2015 | Langen | B65B 43/265 705/26.81 |
| 2016/0257089 A1 | 9/2016 | Deering | |
| 2018/0126683 A1 * | 5/2018 | Johnson | B31B 50/07 |
| 2022/0089308 A1 | 3/2022 | Monti | |

OTHER PUBLICATIONS

“LDXRTB 2.0 Series Random Top and Bottom Drive Fully Automatic Case Sealer Operator’s Manual”, Loveshaw, an ITW Company, Little David Case Sealer (100 pages), Feb. 18, 2013.

“Little David Owners Manual LD16R”, The Loveshaw Corporation (59 pages).

* cited by examiner

CASE FORMER WITH CASE-SQUARING ASSEMBLY

PRIORITY

This continuation application claims priority to and the benefit of U.S. Non-Provisional patent application Ser. No. 16/525,139, filed Jul. 29, 2019, which claims priority to and the benefit of U.S. Provisional Patent Application No. 62/714,268, filed Aug. 3, 2018, the entire contents of which are incorporated herein by reference.

FIELD

The present disclosure relates to case formers, and more particularly to a case former that includes a case-squaring assembly.

BACKGROUND

Every day companies around the world pack millions of items in cases (such as boxes formed from corrugated) to prepare them for shipping. Many of these companies use automatic case formers to (at least partially) automate the packing process, and particularly to automate forming open-top cases from flat blanks. A typical case former is configured to unfold the blank to form a quadrilateral tube with an open top and bottom. The case former is configured to fold the bottom flaps shut to close the bottom of the case and to seal the bottom flaps shut via tape. The open-topped case is now ready to receive items.

SUMMARY

Various embodiments of the present disclosure provide a case former configured to receive a case in a blank configuration, open the case into a tubular configuration, fold the lower minor flaps to manipulate the case into a partially closed-bottom configuration, square the case while in the partially closed-bottom configuration, and fold and tape the lower major flaps shut to manipulate the case into a closed-bottom configuration. The squaring step ensures that the case has a rectangular cross-section after taping rather than a rhomboid cross-section.

In one embodiment, a case former of the present disclosure comprises a case-moving assembly comprising a case mover and a case-moving-assembly actuator operably connected to the case mover to move the case mover from a rest position to a delivery position; a case squarer comprising a squaring component and a case-squarer actuator operably connected to the squaring component to move the squaring component from a squaring position to a case-passage position; and a controller operably connected to the case-moving-assembly actuator and the case-squarer actuator, the controller configured to, after the case has been received by the case mover, control the case-moving-assembly actuator to move the case mover from the rest position toward the delivery position so the case contacts a part of the case squarer.

In one embodiment, a method of operating a case former of the present disclosure comprises, after a case has been received by a case mover, moving the case mover from a rest position toward a delivery position so the case contacts a part of a case squarer; and continue moving the case mover toward the delivery position to manipulate the case into having a rectangular cross-section.

DETAILED DESCRIPTION

Figure 1:
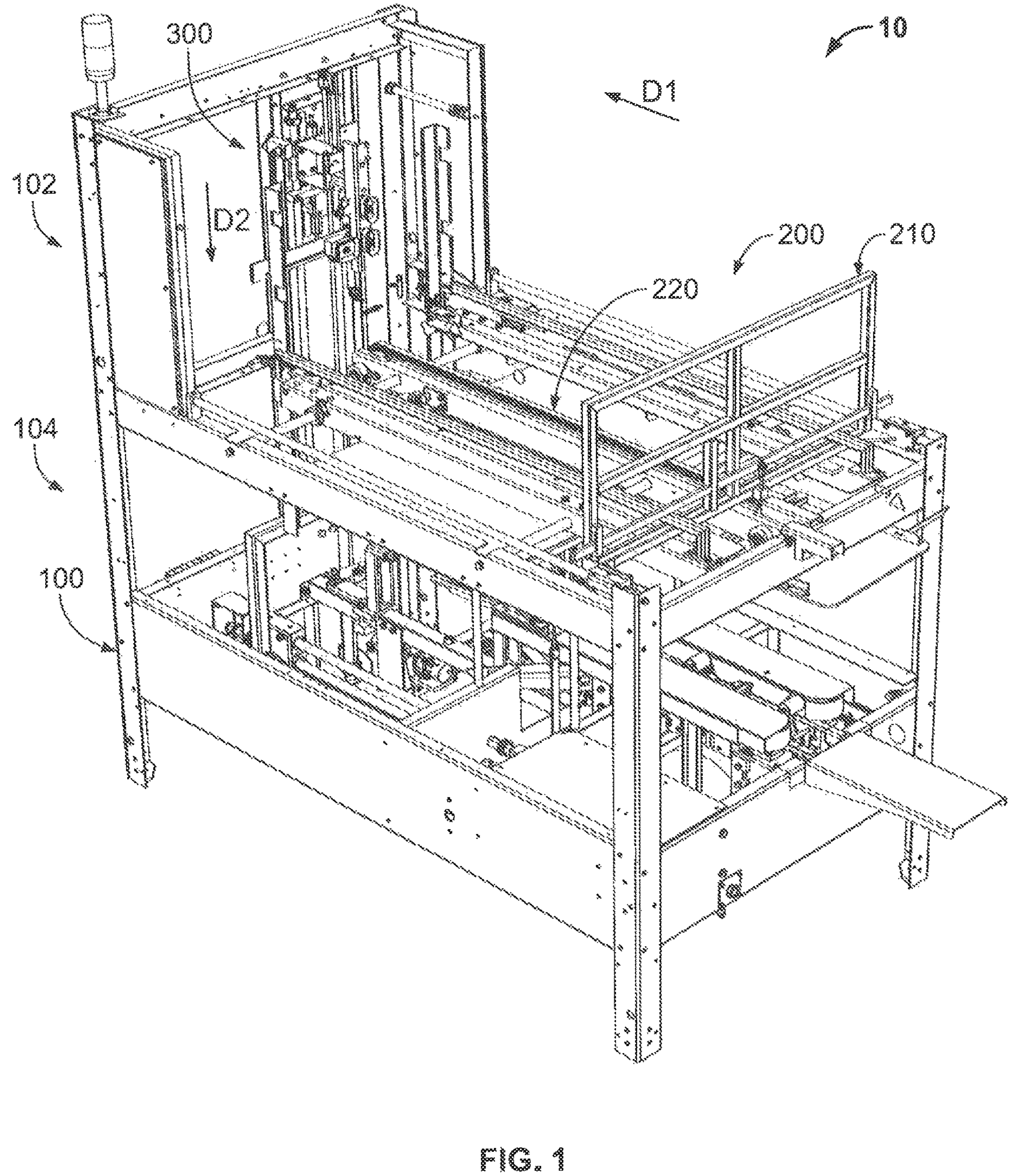
FIG. 1 is a perspective view of one example embodiment of a case former of the present disclosure.

While the systems, devices, and methods described herein may be embodied in various forms, the drawings show and the specification describes certain exemplary and non-limiting embodiments. Not all of the components shown in the drawings and described in the specification may be required, and certain implementations may include additional, different, or fewer components. Variations in the arrangement and type of the components; the shapes, sizes, and materials of the components; and the manners of connections of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as coupled, mounted, connected, etc., are not intended to be limited to direct mounting methods but should be interpreted broadly to include indirect and operably coupled, mounted, connected and like mounting methods. This specification is intended to be taken as a whole and interpreted in accordance with the principles of the present disclosure and as understood by one of ordinary skill in the art.

FIGS. 1-6B show one embodiment of the case former 10 of the present disclosure and the components thereof. FIGS. 7A-7D show an example case C in four different configurations $C_1$ to $C_4$, described below. FIGS. 8A-8D show the case C as it moves through the case-squaring assembly of the case former 10.

As shown in FIGS. 7A-7D, the case C includes a first side wall SW1, a second side wall SW2, a first end wall EW1, a second end wall EW2, a first upper major flap UMa1, a second upper major flap UMa2, a first upper minor flap UMi1, a second upper minor flap UMi2, a first lower major flap LMa1, a second lower major flap LMa2, a first lower minor flap LMi1, and a second lower minor flap LMi2 (not shown but numbered in the detailed description for clarity).

The first and second end walls EW1 and EW2 are integrally connected to left and right side edges (from the viewpoint shown in FIG. 7A), respectfully, of the first side wall SW1 and separated from the first side wall SW1 via vertical fold lines (such as creases or scores) $F_1$ and $F_2$, respectively. The first and second end walls EW1 and EW2 are also integrally connected to right and left side edges (from the viewpoint shown in FIGS. 7B-7D), respectfully, of the second side wall SW2 and separated from the second side wall SW2 via vertical fold lines $F_3$ and $F_4$, respectively, such that the first and second end walls EW1 and EW2 and the first and second side walls SW1 and SW2 are all integrally connected. The first upper and lower major flaps UMa1 and LMa1 are integrally connected to the upper and lower edges, respectfully, of the first side wall SW1 and separated from the first side wall SW1 via horizontal fold lines $F_5$ and $F_6$ (not shown but numbered in the detailed description for clarity), respectively. The second upper and lower major flaps UMa2 and LMa2 are integrally connected to the upper and lower edges, respectfully, of the second side wall SW2 and separated from the second side wall SW2 via horizontal fold lines $F_7$ and $F_8$, respectively. The first upper and lower minor flaps UMi1 and LMi1 are integrally connected to the upper and lower edges, respectfully, of the first end wall EW1 and separated from the first end wall EW1 via horizontal fold lines $F_9$ and $F_{10}$, respectively. The second upper and lower minor flaps UMi2 and LMi2 are integrally connected to the upper and lower edges, respectfully, of the second end wall EW2 and separated from the second end wall EW2 via horizontal fold lines $F_{11}$ and $F_{12}$ (not shown but numbered in the detailed description for clarity), respectively.

In FIGS. 7A-7D, the fold lines are drawn in phantom to indicate that the walls/flaps on either side of them are not folded and are drawn in solid to indicate that those walls/flaps are folded. For example, the fold line $F_1$ separating the first side wall SW1 and the first end wall EW1 is drawn in phantom in FIG. 7A to indicate that those walls are not folded along the fold line $F_1$ and in solid in FIGS. 7B-7D to indicate that those walls are folded along the fold line $F_1$.

Figure 7A:
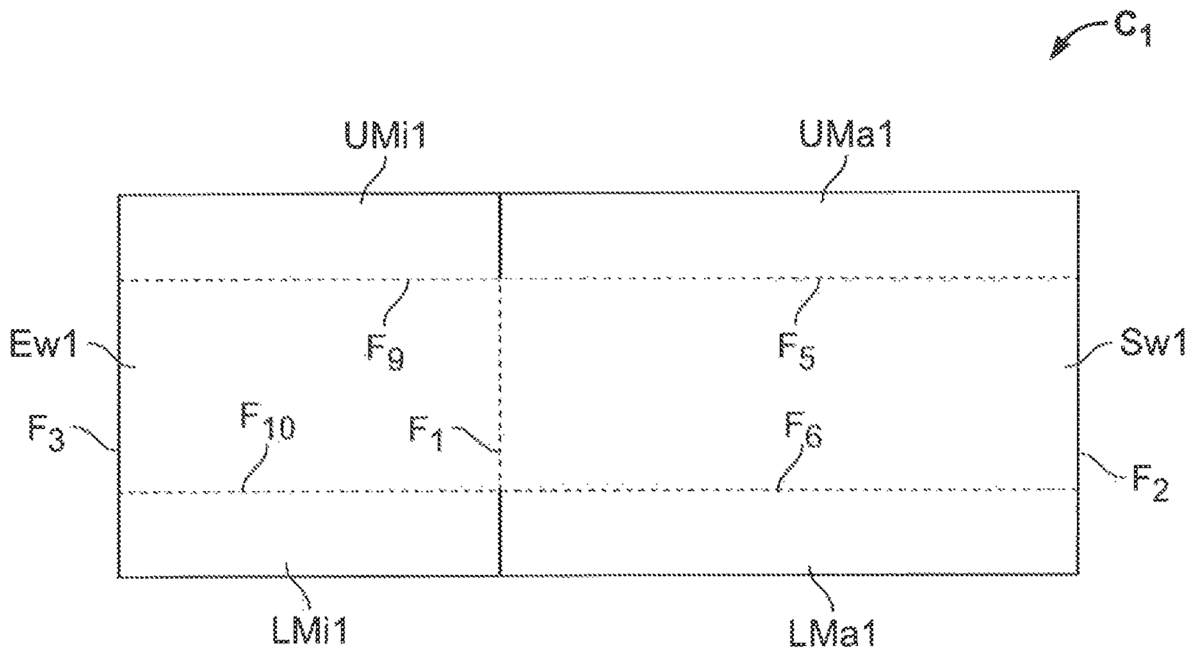
FIGS. 7A-7D show an example case in four different configurations.
Figure 7B:
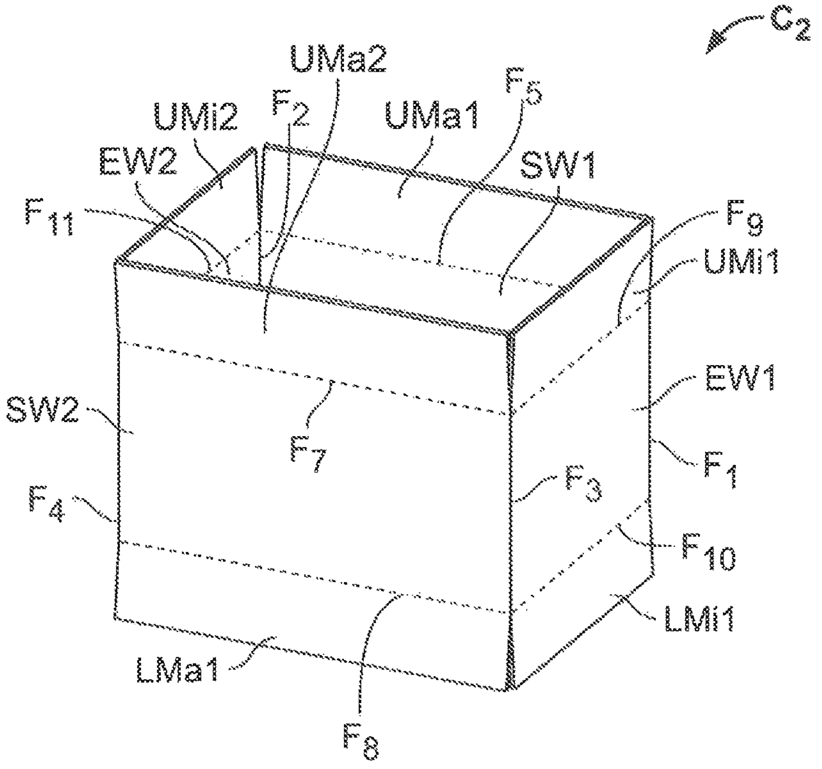
Figure 7C:
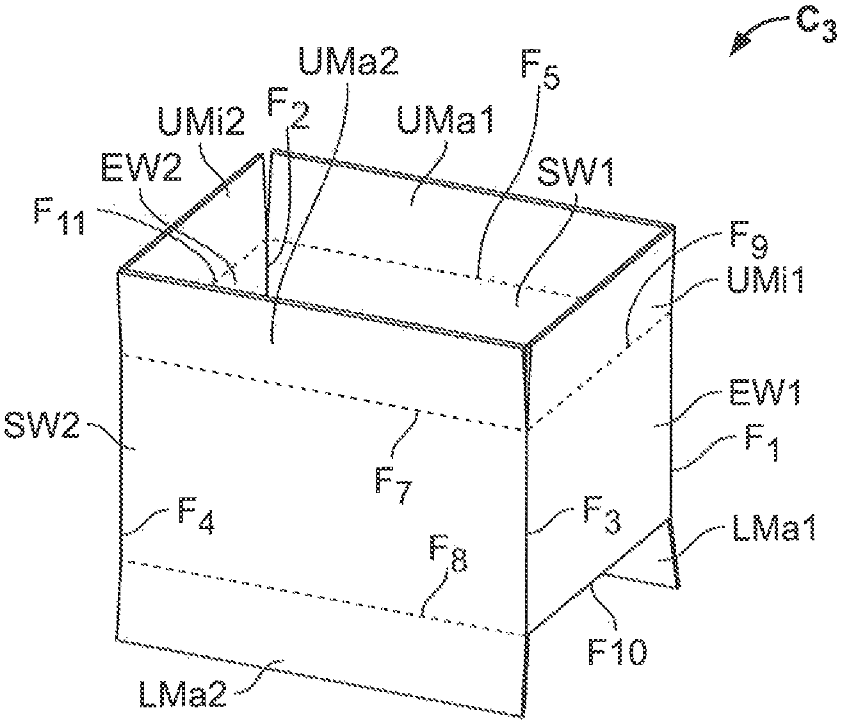
Figure 7D:
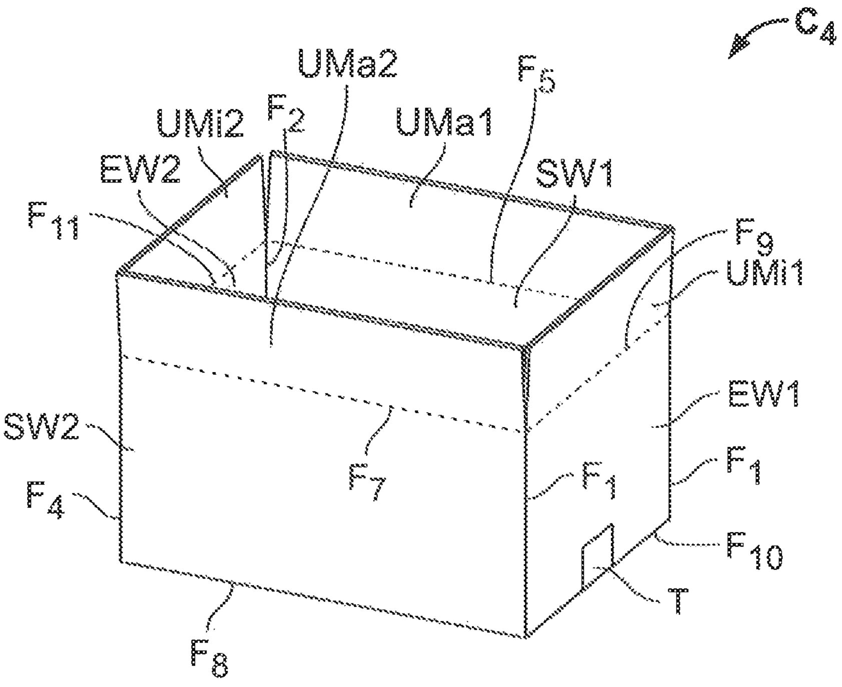
Figure 8A:
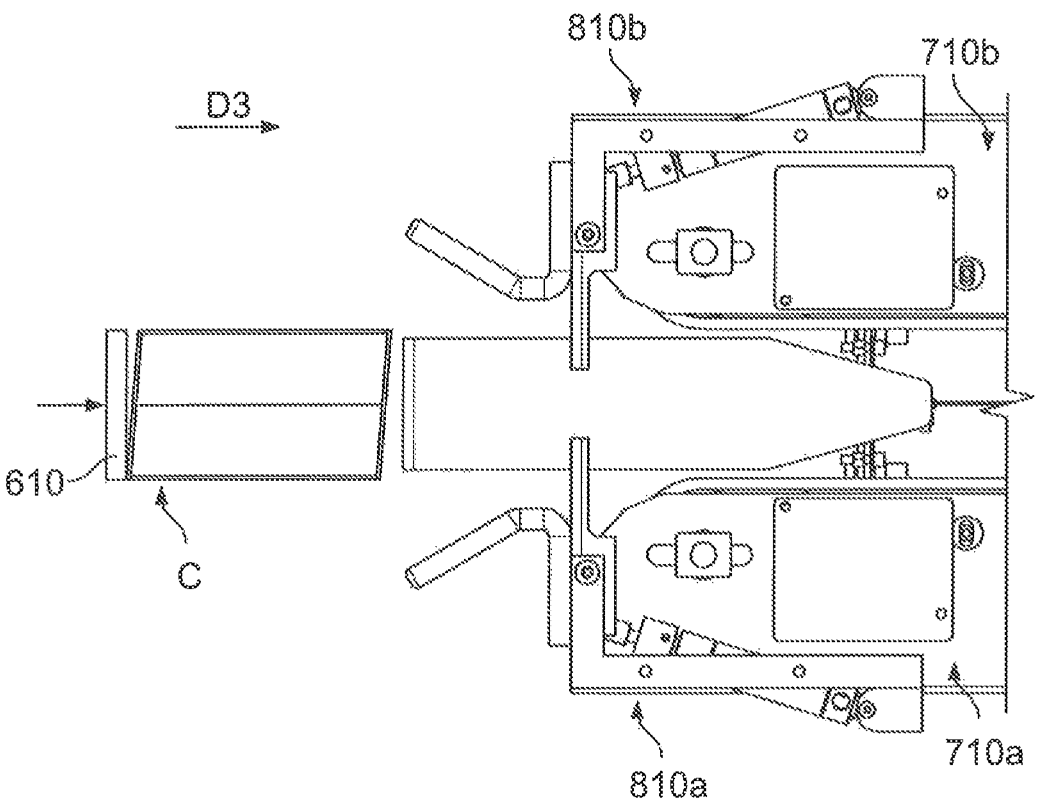
FIGS. 8A-8D are a simplified fragmentary top plan view of a case moving through the case-squaring assembly of the case former of FIG. 1.
Figure 8B:
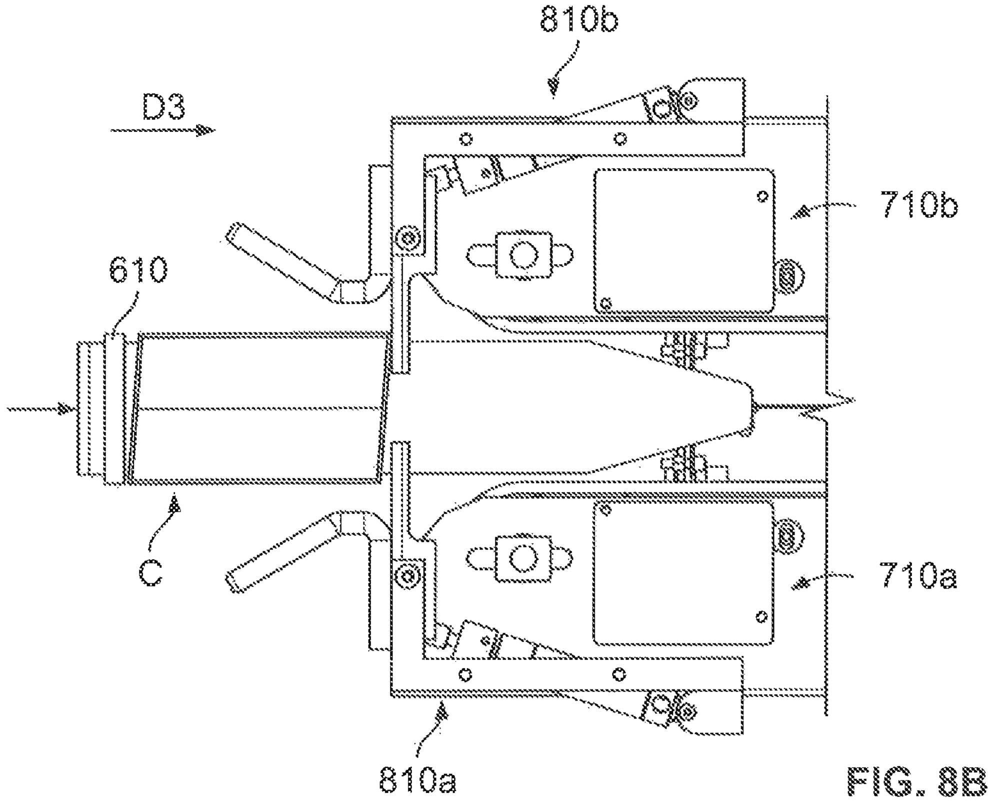
Figure 8C:
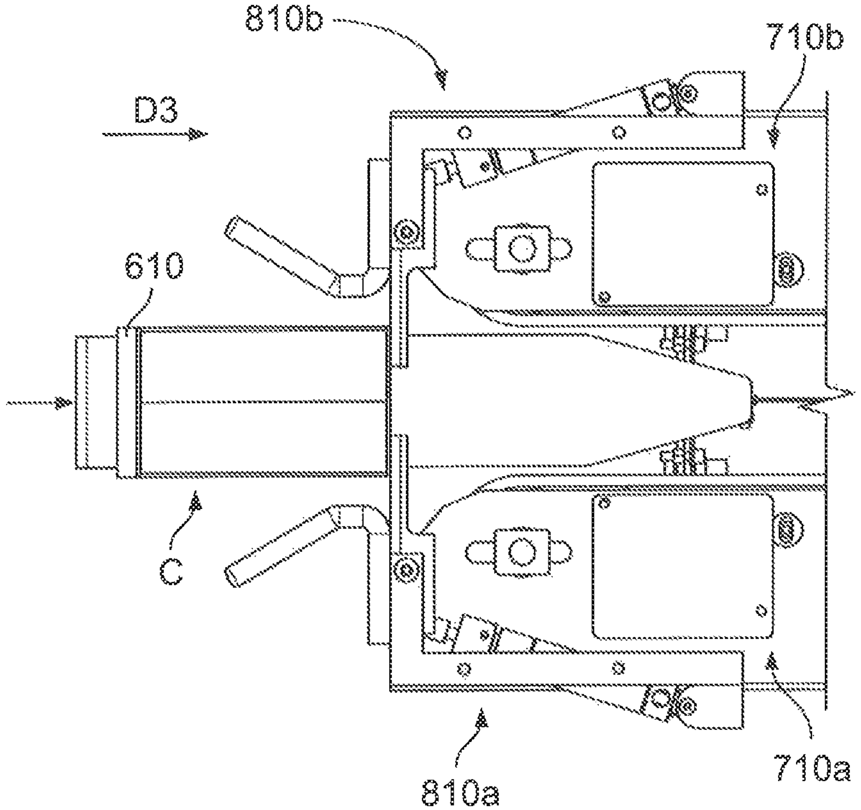
Figure 8D:
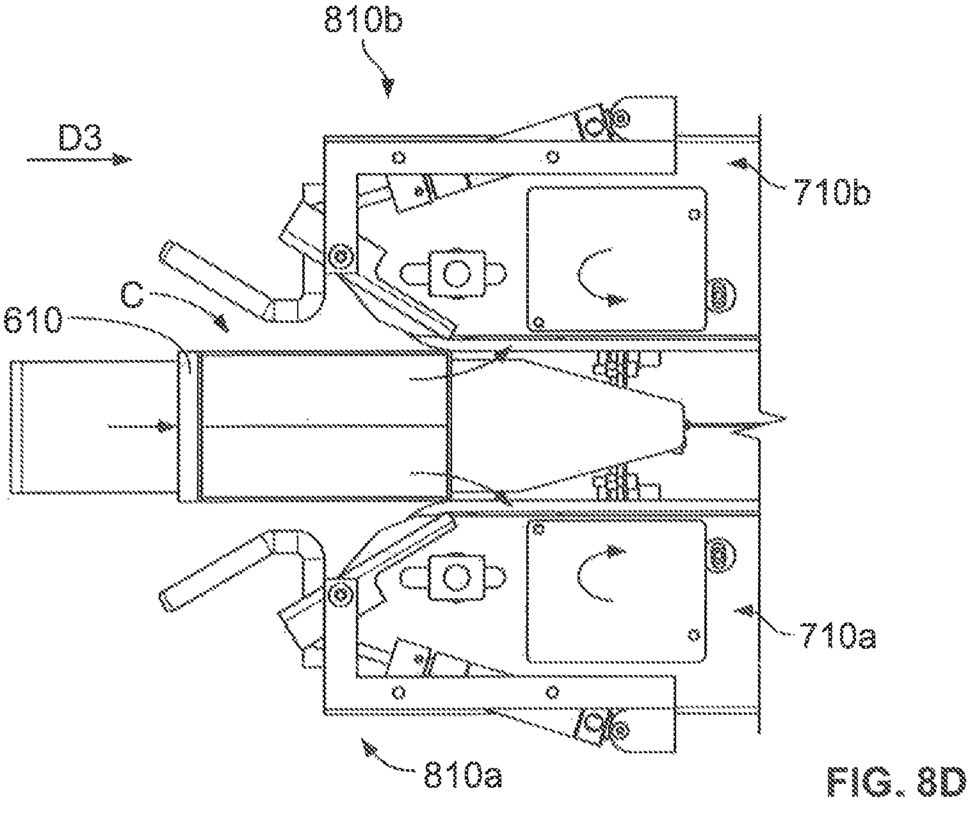

FIG. 7A shows the case C in a blank configuration $C_1$ in which the case C is folded along the fold lines $F_2$ and $F_3$ (and not along the fold lines $F_1$ and $F_4$) such that the case C is substantially flat. FIG. 7B shows the case C in a tubular configuration $C_2$ in which the case C is folded along the fold lines $F_1$-$F_4$ and generally forms a quadrilateral tube with an open top and bottom. FIG. 7C shows the case C in a partially closed-bottom configuration $C_3$ in which the case C is folded along the fold lines $F_1$-$F_4$, $F_{10}$, and $F_{12}$ such that the lower minor flaps LMi1 and LMi2 are folded while the lower major flaps LMa1 and LMa2 remain unfolded. FIG. 7D shows the case C in a closed-bottom configuration $C_4$ in which the case C is folded along the fold lines $F_1$-$F_4$, $F_6$, $F_8$, $F_{10}$, and $F_{12}$ such that the lower major flaps LMa1 and LMa2 and the lower minor flaps LMi1 and LMi2 are folded. Tape T applied to the lower major flaps holds them (and therefore the lower minor flaps) in the folded position.

Generally, the case former 10 is configured to receive the case C in the blank configuration $C_1$, open the case C into the tubular configuration $C_2$, fold the lower minor flaps to manipulate the case C into the partially closed-bottom configuration $C_3$, square the case C while in the partially closed-bottom configuration $C_3$, and fold and tape the lower major flaps shut to manipulate the case C into the closed-bottom configuration $C_4$. Afterwards, the open-topped case C is ready to receive items (and if necessary, dunnage) before the upper major and minor flaps are folded and taped shut (such as via a separate case sealer) and the case C is ready for transport. The squaring step ensures that the case has a rectangular cross-section after taping rather than a rhomboid cross-section, as described below.

The case former 10 includes a frame 100, a case-hopper assembly 200, a first case-mover assembly 300, a case-opener assembly 400, a minor-flap-folding assembly 500, a second case-mover assembly 600, a third case-mover assembly 700, a case-squaring assembly 800, and a case-sealing assembly 900.

As best shown in FIG. 1, the frame 100 is formed from multiple solid and/or tubular members (not individually labeled) and configured to support the other components of the case former 10. The frame 100 has an upper frame portion 102 and a lower frame portion 104 below the upper frame portion 102. The illustrated frame 100 is merely one example configuration, and any suitable configuration may be employed.

As best shown in FIG. 1, the case-hopper assembly 200 is supported by the upper frame portion 102 and configured to receive and hold multiple cases C in the blank configuration $C_1$ and sequentially deliver the cases C in the blank configuration $C_1$ to the first case-mover assembly 300. The case-hopper assembly 200 includes a case guide 210 and a case-hopper-assembly actuator 220 operably connected to the case guide 210 to move the case guide 210 toward the first case-mover assembly 300 in the direction D1. In this illustrated embodiment, the case-hopper-assembly actuator 220 includes a pneumatically driven chain-drive assembly (not labeled), though the case-hopper-assembly actuator 220 may include any other suitable actuator.

Figure 2:
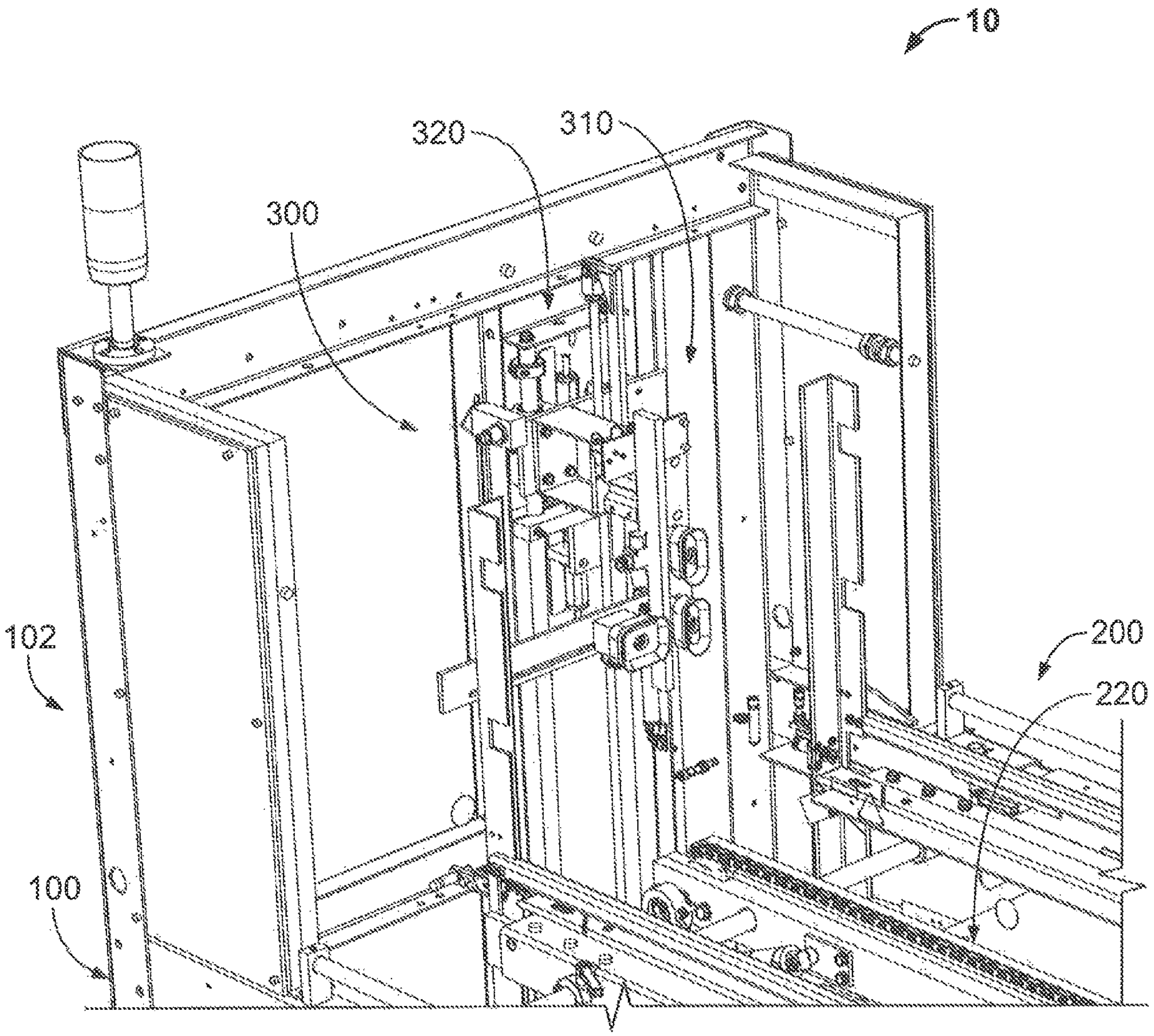
FIG. 2 is a fragmentary perspective view of part of the case former of FIG. 1.

As best shown in FIG. 2, the first case-mover assembly 300 is supported by the upper and lower frame portions 102 and 104 and configured to move cases C in the blank configuration $C_1$ from the case-hopper assembly 200 to the case-opener assembly 400, the minor-flap-folding assembly 500, and the second case-mover assembly 600. The first case-mover assembly 300 includes a first case mover 310 mounted to a vertical track (not labeled) and a first-case-mover-assembly actuator 320 operably connected to the first case mover 310 to move the first case mover 310 in a direction D2 from an upper position adjacent the case-hopper assembly 200 (FIGS. 1 and 2) to a lower position (not shown) adjacent the case-opener assembly 400, the minor-flap-folding assembly 500, and the second case-mover assembly 600. In this illustrated embodiment, the first case mover 310 includes a vacuum arm including one or more vacuum cups (not shown), though the first case mover 310 may include any other components suitable for retaining and then releasing a case in the blank configuration (as described below). Additionally, the first-case-mover-assembly actuator 320 includes a pneumatic cylinder assembly, though the first-case-mover-assembly actuator 320 may include any other suitable actuator.

Figure 3:
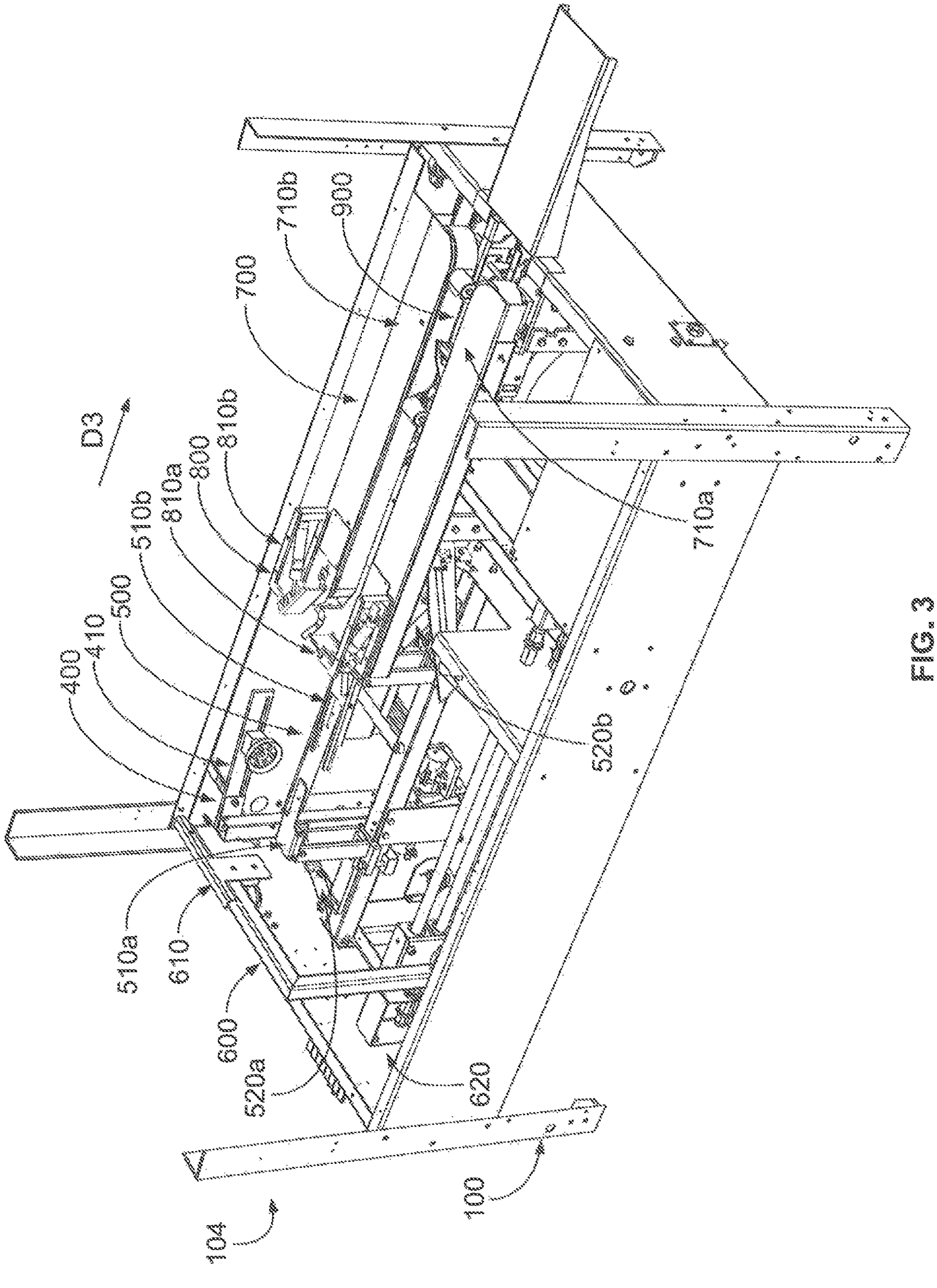
FIG. 3 is a fragmentary perspective view of another part of the case former of FIG. 1.

As best shown in FIG. 3, the case-opener assembly 400 is supported by the lower frame portion 104 and configured to engage a case C in the blank configuration $C_1$ and manipulate the case C into the tubular configuration $C_2$. The case-opener assembly 400 includes a case opener 410 and a case-opener-assembly actuator 420 operably connected to the case opener 410 to rotate the case opener 410 about a vertical axis between a case-engaging position (not shown) and a case-opening position (FIG. 3). In this illustrated embodiment, the case opener 410 includes a vacuum arm including one or more vacuum cups, though the case opener 410 may include any other components suitable for engaging and manipulating the case C from the blank configuration $C_1$ into the tubular configuration $C_2$. Additionally, the case-opener-assembly actuator 420 includes a pneumatic cylinder assembly, though the case-opener-assembly actuator 420 may include any other suitable actuator.

As best shown in FIG. 3, the minor-flap-folding assembly 500 is supported by the lower frame portion 104 and configured to fold the minor flaps LMi1 and LMi2 of the case C to manipulate the case C from the tubular configuration $C_2$ into the partially closed-bottom configuration $C_3$. The minor-flap-folding assembly 500 includes a first minor-flap folder 510*a*, a second minor-flap folder 510*b*, a first minor-flap-folder actuator 520*a*, and a second minor-flap-actuator 520*b*. The first minor-flap-folder actuator 520*a* is operably connected to the first minor-flap folder 510*a* to rotate the first minor-flap folder 510*a* about a horizontal axis between a rest position (not shown) and a minor-flap-folding position (FIG. 3). Similarly, the second minor-flap-folder actuator 520*b* is operably connected to the second minor-flap folder 510*b* to rotate the second minor-flap folder 510*b* about a horizontal axis between a rest position (not shown) and a minor-flap-folding position (FIG. 3). In this illustrated embodiment, the minor-flap-folder actuators 520*a* and 520*b* each include a pneumatic cylinder assembly, though the minor-flap-folder actuators 520*a* and 520*b* may include any other suitable actuators.

As best shown in FIG. 3, the second case-mover assembly 600 is supported by the lower frame assembly 104 and configured to move the case C in the partially closed-bottom configuration $C_3$ toward the third case-mover assembly 700 and the case-squaring assembly 800. The second case-mover assembly 600 includes a second case mover 610 mounted to a horizontal track (not labeled) and a second-case-mover-assembly actuator 620 operably connected to the second case mover 610 to move the second case mover 610 in a direction D3 between a rest position adjacent the case-opener assembly 400 and the minor-flap-folding assembly 500 (FIG. 3) and a delivery position (not shown) adjacent the third case-mover assembly 700 and the case-squaring assembly 800. In this embodiment, the second case mover 610 includes a planar case-contact surface (not labeled) positioned to contact the second end wall EW2 of the case as the second case mover 610 moves the case in the direction D3. In this illustrated embodiment, the second-case-mover-assembly actuator 620 includes a pneumatic cylinder assembly, though the second-case-mover-assembly actuator 620 may include any other suitable actuator.

As best shown in FIG. 3, the third case-mover assembly 700 is supported by the lower frame assembly 104 and configured to receive the case C in the partially closed-bottom configuration $C_3$ and manipulate the case C into the closed-bottom configuration $C_4$ while moving the case C in the direction D3 to a case-discharge position. The third case-mover assembly 700 includes a first side-drive assembly 710*a*, a second side-drive assembly 710*b*, and side-drive-assembly actuator 720. The first and second side-drive assemblies 710*a* and 710*b* each include an endless belt mounted on two spaced-apart pulleys (not labeled). The side-drive-assembly actuator 720 is operably connected to the first and second side-drive assemblies 710*a* and 710*b* (such as to the pulleys) to drive the first and second side-drive assemblies 710*a* and 710*b* (such as the endless belts) at the same (or nearly the same) rate. In this illustrated embodiment, the side-drive-assembly actuator 720 includes an electric motor, though the side-drive-assembly actuator 720 may include any other suitable actuator. Although not labeled, the third case-mover assembly 700 includes major-flap folders (such as stationary angled plates) below the first and second side-drive assemblies 710*a* and 710*b* that are sized, shaped, positioned, and otherwise configured to engage and fold the first and second lower major flaps LMa1 and LMa2 as the case C moves past them through the third case-mover assembly 700.

Figure 5:
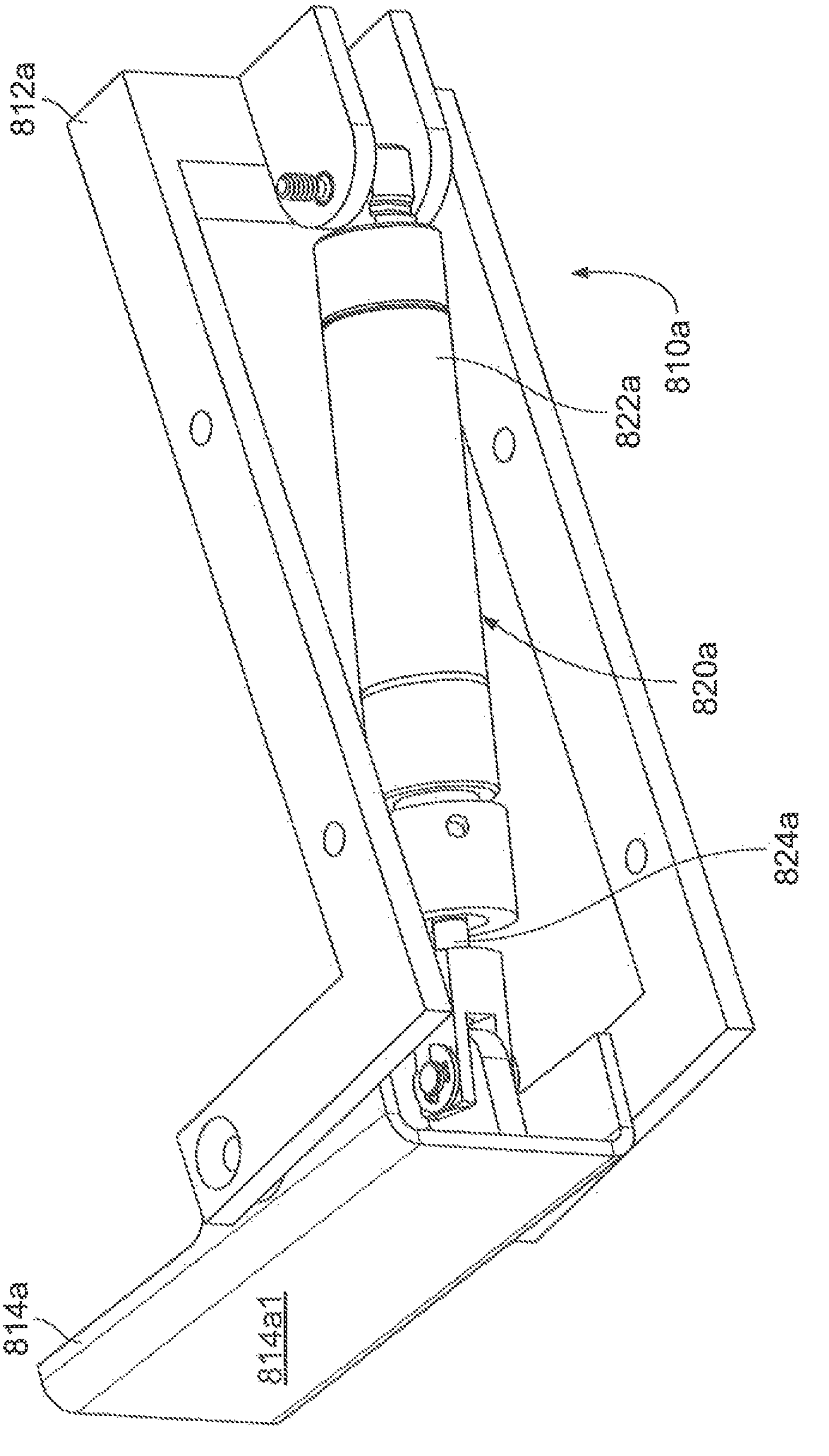
FIG. 5 is a perspective view of one of the case squarers of the case-squaring assembly of the case former of FIG. 1.

As best shown in FIG. 3, the case-squaring assembly 800 is supported by the third case-mover assembly 700 and configured to ensure the case C in the partially closed-bottom configuration $C_3$ has a rectangular cross-section (taken on a plane perpendicular to the side and end walls of the case and as viewed from the top or bottom) before being received between the side-drive assemblies 710*a* and 710*b* of the third case-mover assembly 700. The case-squaring assembly 800 includes a first case squarer 810*a* and a second case squarer 810*b*. As best shown in FIG. 5, the first case squarer 810*a* includes a frame 812*a*, a squaring component 814*a* having a squaring face 814*a*1, and a first-case-squarer actuator 820*a*. In this example embodiment, the first-case-squarer actuator 820*a* includes a double-acting pneumatic cylinder having a cylinder 822*a*, a piston (not shown) slidably disposed within the cylinder 822*a*, and a rod 824*a* having one end connected to the piston and another end external to the cylinder 822*a*. The squaring component 814*a* is rotatably mounted to one end of the frame 812*a*. The end of the rod 824*a* external to the cylinder 822*a* is connected to one end of the squaring component 814*a*.

Figure 6B:
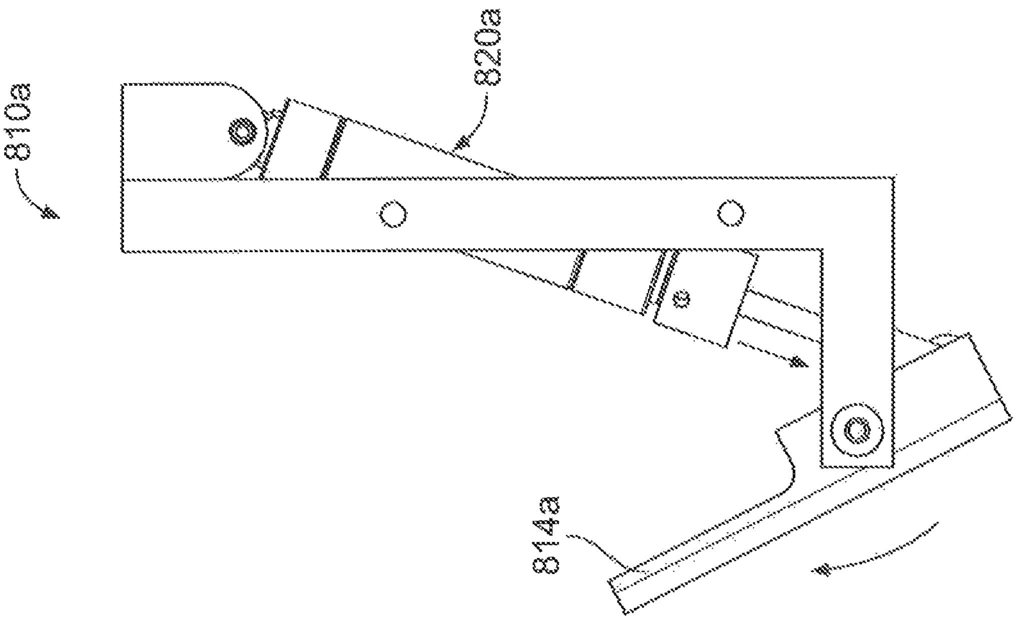
FIGS. 6A and 6B are top plan views of the case squarer of FIG. 5 in the squaring position and the case-passage position, respectively.
Figure 6A:
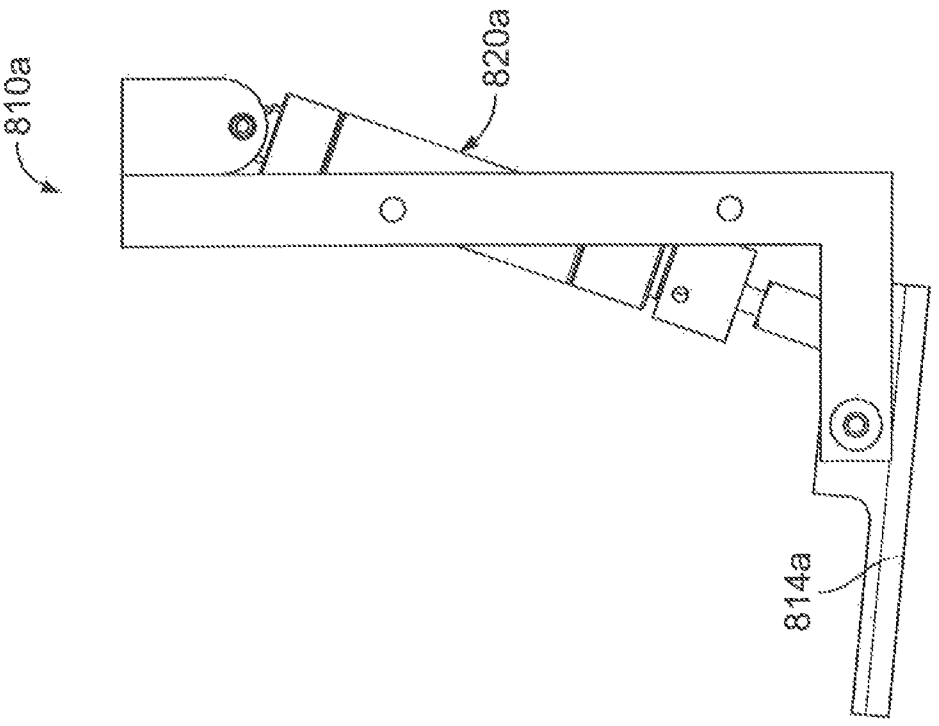

The first-case-squarer actuator 820*a* is operably coupled to the squaring component 814*a* to rotate the squaring component 814*a* between a squaring position (FIG. 6A) and a case-passage position (FIG. 6B). To move the squaring component 814*a* from the squaring position to the case-passage position, pressurized air is introduced into the cylinder 822*a* between the piston and the end of the cylinder 822*a* connected to the frame 812*a*. This causes the rod 824*a* to move further out of the cylinder 822*a* and therefore cause the squaring component 814*a* to rotate into the case-passage position. Conversely, to move the squaring component 814*a* from the case-passage position to the squaring position, pressurized air is introduced into the cylinder 822*a* on the opposite side of the piston. This causes the rod 824*a* to move back into the cylinder 822*a* and therefore cause the squaring component 814*a* to rotate into the squaring position. The second case squarer 810*b* is formed identically to the first case squarer 810*a* (although flipped for mounting to the other side-drive assembly as shown in FIG. 3) and is not separately described for brevity. Although not shown, components of the second case squarer 810*b* are referred to using identical element numbers as those of the first case squarer 810*a* with the “a” replaced with a “b.”

The case-sealing assembly 900 is supported by the lower frame assembly 104 and positioned between the side-drive assemblies 710*a* and 710*b* of the third case-mover assembly 700. The case-sealing assembly 900 is configured to apply tape to the first and second lower major flaps LMa1 and LMa2 of the case C as the third case-mover assembly 700 moves the case C past the case-sealing assembly 900 to retain those flaps in the folded position and therefore retain the case C in the closed-bottom configuration $C_4$, as is known in the art. One example case-sealing assembly 900 is described in U.S. Pat. No. 9,630,796, the entire contents of which are incorporated herein by reference.

As used herein, the term “downstream” means the direction of movement of the case C through the case former 10 (i.e., in the directions D1, D2, and D3) while the term “upstream” means opposite the direction of movement of the case C through the case former 10 (i.e., opposite the directions D1, D2, and D3).

The case former 10 includes a controller 12, which may be a programmable logic controller or any other suitable type of controller, that includes any suitable processing device(s) (such as a microprocessor, a microcontroller-based platform, a suitable integrated circuit, or one or more application-specific integrated circuits) and any suitable memory device(s) (such as random access memory, readonly memory, or flash memory). The memory device stores instructions executable by the processing device to control operation of various components of the case former 10, as described below.

Figure 4:
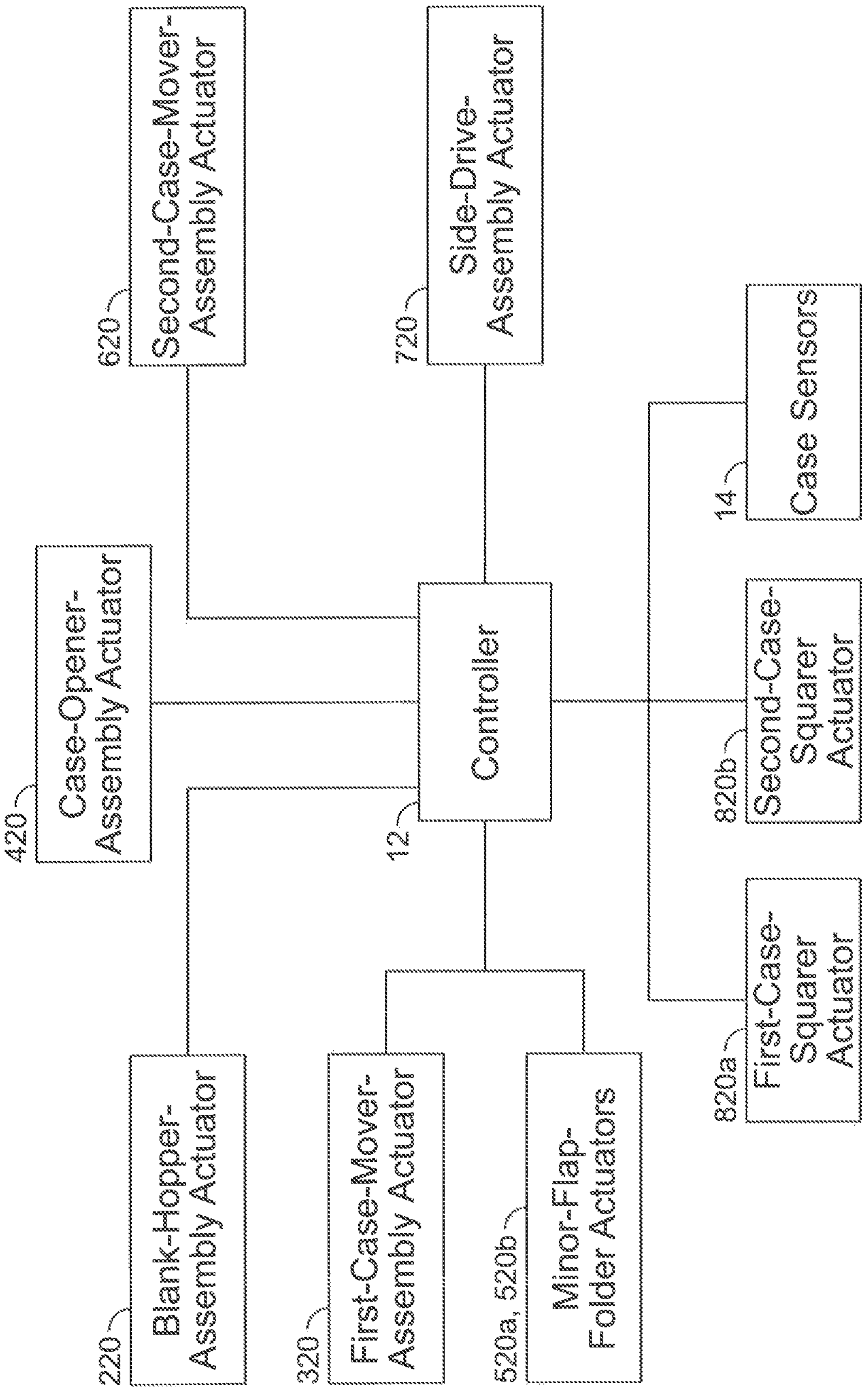
FIG. 4 is a block diagram showing certain components of the case former of FIG. 1.

As shown in FIG. 4, the controller 12 is communicatively connected to multiple case sensors 14 positioned throughout the case former 10 and configure to directly or indirectly detect the presence (and/or the absence) of the case C. A sensor is configured to directly detect the presence of the case C by detecting the case C itself at a particular position. A sensor is configured to indirectly detect the presence of the case C by detecting another component, such as the piston within the cylinder or the case-squaring component, at a point that indicates the case has reached that particular position. The sensors 14 are configured to send an appropriate signal to the controller 12 responsive to detecting the presence (and/or the absence) of the case C. The sensors 14 may be any suitable sensors, such as proximity sensors (such as photoelectric or other optical sensors, capacitive sensors, magnetic sensors, and the like).

As also shown in FIG. 4, the controller 12 is operably connected to the various actuators of the case former 10 to control operation of the actuators responsive to, for instance, signals received from the sensors 14, as explained below. Specifically, the controller 12 is operably connected to: (1) the case-hopper-assembly actuator 220 to control the case-hopper-assembly actuator 220 to move the case guide 210; (2) the first-case-mover-assembly actuator 320 to control the first-case-mover-assembly actuator 320 to move the first case mover 310; (3) the case-opener-assembly actuator 420 to control the case-opener-assembly actuator 420 to move the case opener 410; (4) the minor-flap-folder actuators 520*a* and 520*b* to control the minor-flap-folder actuators 520*a* and 520*b* to move the first and second minor-flap folders 510*a* and 510*b*, respectively; (5) the second-case-mover-assembly actuator 620 to control the second-case-mover-assembly actuator 620 to move the second case mover 610; (6) the side-drive-assembly actuator 720 to control the side-drive-assembly actuator 720 to drive the first and second side-drive assemblies 710*a* and 710*b*; and (7) the first- and second-case-squarer actuators 820*a* and 820*b* to control the first- and second-case-squarer actuators 820*a* and 820*b* to move the squaring components 814*a* and 814*b*, respectively.

Operation of the case former 10 to manipulate a case C from the blank configuration $C_1$ into the closed-bottom configuration $C_4$ is now described. Initially: (1) multiple cases C in the blank configuration $C_1$ are loaded into the case-hopper assembly 200 with their first side wall SW1 and their first end wall EW1 facing the case guide 210; (2) the first case mover 310 of the first case-mover assembly 300 is in its upper position; (3) the case opener 410 of the case-opener assembly 400 is in its case-opening position; (4) the first and second minor-flap folders 510*a* and 510*b* of the minor-flap-folding assembly 500 are in their rest positions; (5) the second case mover 610 of the second case-mover assembly 600 is in its rest position; (6) the squaring components 814*a* and 814*b* of the first and second case squarers 810*a* and 810*b* of the case-squaring assembly 800 are in their squaring positions; and (7) the side-drive-assembly actuator 720 is driving the first and second side-drive assemblies 710*a* and 710*b*.

The controller 12 controls the case-hopper-assembly actuator 220 to move the case guide 210 toward the first case mover 310 of the first case-mover assembly 300 in the direction D1 to bring the second end wall EW2 of the case C in the blank configuration $C_1$ into contact with the vacuum cups of the first case mover 310. One of the sensors 14 detects that the case C in the blank configuration $C_1$ has contacted the first case mover 310 and in response sends an appropriate signal to the controller 12. In response to receiving that signal, the controller 12 energizes the vacuum cups of the first case mover 310 to create a vacuum bond between the vacuum cups and the second end wall EW2 of the case C. Thereafter, the controller 12 controls the first-case-mover-assembly actuator 320 to move the first case mover 310 in the direction D2 from its upper position to its lower position, thereby withdrawing the case C from the case-hopper assembly 200.

One of the sensors 14 detects that the first case mover 310 has reached its lower position and in response sends an appropriate signal to the controller 12. In response to receiving that signal, the controller 12 controls the case-opener-assembly actuator 420 to move the case opener 410 from its case-opening position to its case-engaging position to bring the vacuum cups of the case opener 410 into contact with the first side wall SW1 of the case C in the blank configuration $C_1$. One of the sensors 14 detects that the case opener 410 has contacted the case C (or that the case opener 410 has reached the case-engaging position) and in response sends an appropriate signal to the controller 12. In response to receiving that signal, the controller 12 energizes the vacuum cups of the case opener 410 to create a vacuum bond between the vacuum cups and the first side wall SW1 of the case C. The controller 12 then controls the case-opener-assembly actuator 420 to move the case opener 410 from its case-engaging position to its case-opening position. This motion of the case opener 410 combined with the vacuum bonds between the first case mover 310 and the case opener 410 with the second end wall EW2 and the first side wall SW1 of the case C, respectively, cause the case C to be manipulated into the tubular configuration $C_2$ along the fold lines $F_1$, $F_2$, $F_3$, and $F_4$ such that the first end wall EW1 faces the third case-moving assembly 700.

One of the sensors 14 detects that the case opener 410 has reached its case-opening position and in response sends an appropriate signal to the controller 12. In response to receiving that signal, the controller 12: (1) controls the first and second minor-flap-folder actuators 520*a* and 520*b* to move the first and second minor-flap folders 510*a* and 510*b* to their flap-folding positions; (2) de-energizes the vacuum cups of the first case mover 310 to break the vacuum bond between the vacuum cups and the second end wall EW2 of the case C; (3) controls the first-case-mover-assembly actuator 320 to move the first case mover 310 in the direction opposite D1 from its lower position to its upper position; and (4) de-energizes the vacuum cups of the case opener 410 to break the vacuum bond between the vacuum cups and the first side wall SW1 of the case C. Movement of the first and second minor-flap folders 510*a* and 510*b* to their flap-folding positions causes them to contact and fold the first and second lower minor flaps LMi1 and LMi2, respectively, along the fold lines $F_{10}$ and $F_{12}$, respectively, to manipulate the case C into the partially closed-bottom configuration $C_3$.

One of the sensors 14 detects that the minor-flap folders 510*a* and 510*b* have reached their flap-folding positions and in response sends an appropriate signal to the controller 12. In response to receiving that signal, the controller 12 controls the second-case-mover-assembly actuator 620 to move the second case mover 610 in the direction D3 from its rest position to its delivery position. This causes the second case mover 610 to contact the second end wall EW2 of the case C and move the case C toward the third case-mover assembly 700 and the case-squaring assembly 800.

As shown in FIG. 7A, at this point the case C may have a cross-section that resembles a rhomboid more than a rectangle. That is, at this point the interior angles between adjacent ones of the first and second side walls SW1 and SW2 and the first and second end walls EW1 and EW2 may not be 90 degrees. This is problematic because if a case having a rhomboid cross-section enters the third case-moving assembly 700 it will be taped shut via the case-sealing assembly 900 before exiting the third case-moving assembly 700 and thus retain that rhomboid cross-section. Cases with rhomboid cross-sections are problematic because case-sealing assemblies are designed to seal cases with rectangular cross-sections and may not properly tape cases with rhomboid cross-sections. This could cause these cases to break open during transit. Additionally, cases with rhomboid cross-sections take up more space than cases with rectangular cross-sections, thus requiring more space during transit. Also, certain items that would fit within a case with a rectangular cross-section cannot fit within that same case with a rhomboid cross-section.

The case-squaring assembly 800 solves this problem by ensuring that cases entering the third case-mover assembly 700 have a rectangular cross-section. As shown in FIG. 7B, as the second case mover 610 moves in the direction D3 toward the delivery position, part of the first end wall EW1 of the case C makes contact with one of the squaring components 814 of one of the case squarers 810. As the second case mover 610 continues to exert a force against the second end wall EW2 and the squaring components 814 resist movement of that part of the first end wall EW1 in the direction D3, the case C is manipulated so the second end wall EW2 is flush against the case-contact surface of the second case mover 610 and the first end wall EW1 is flush against the squaring faces 814*a*1 and 814*b*1 of the case squarers 810, thereby ensuring the case C has a rectangular cross-section, as shown in FIG. 7C.

Unless otherwise indicated, "rectangular cross-section" as used herein does not mean that the interior angles between adjacent ones of the first and second side walls SW1 and SW2 and the first and second end walls EW1 and EW2 are exactly 90 degrees. In certain embodiments, "rectangular cross-section" means that the angles between adjacent ones of the first and second side walls SW1 and SW2 and the first and second end walls EW1 and EW2 are 90 degrees+/−1 degree. In other embodiments, "rectangular cross-section" means that the interior angles between adjacent ones of the first and second side walls SW1 and SW2 and the first and second end walls EW1 and EW2 are 90 degrees+/−2 degrees. In further embodiments, "rectangular cross-section" means that the interior angles between adjacent ones of the first and second side walls SW1 and SW2 and the first and second end walls EW1 and EW2 are 90 degrees+/−3 degrees. In other embodiments, "rectangular cross-section" means that the interior angles between adjacent ones of the first and second side walls SW1 and SW2 and the first and second end walls EW1 and EW2 are 90 degrees+/−4 degrees. In further embodiments, "rectangular cross-section" means that the interior angles between adjacent ones of the first and second side walls SW1 and SW2 and the first and second end walls EW1 and EW2 are 90 degrees+/−5 degrees.

The second case mover 610 continues to exert a force against the second end wall EW2, which causes the squaring components 814 to begin rotating to their case-passage positions. Specifically, the force exerted by the second case mover 610 is large enough to overcome the force exerted by the pressurized air in the cylinders of the squaring components. After the squaring components 814 begin rotating to the case-passage positions and the case C enters the third case-mover assembly 700, one of the sensors 14 detects the case C (either directly or indirectly) and sends an appropriate signal to the controller 12. In this example embodiment, this sensor 14 is a proximity sensor positioned downstream of the squaring faces 814*a*1 and 814*b*1 of the squaring components 814*a* and 814*b* that ensures that the case C contacts the squaring faces before they pivot out of the way. In other embodiments, this sensor may be configured to indirectly detect that the case has moved a certain distance past the squaring components via detecting the position of the squaring components or the position of the pistons of the pneumatic cylinders.

In response, the controller 12 controls the second-case-mover-assembly actuator 620 to move the second case mover 610 from its delivery position to its rest position in the direction opposite D3. The first and second side-drive assemblies 710*a* and 710*b* engage and begin moving the case C in the partially closed-bottom position $C_3$ in the direction D3 toward the case-discharge position. Specifically, the first and second side-drive assemblies 710*a* and 710*b* first move the case C past the major-flap folders, which contact and fold the first and second lower major flaps LMa1 and LMa2, respectively, along the fold lines $F_6$ and $F_8$, respectively, to manipulate the case C into the closed-bottom configuration $C_4$. The first and second side-drive assemblies 710*a* and 710*b* then move the case C past the case-sealing assembly 900, which applies tape to the first and second lower major flaps LMa1 and LMa2 to hold them in the folded position. The first and second side-drive assemblies 710*a* and 710*b* then move the case C to the case-discharge position.

In other embodiments, the case-squaring assembly includes only one case squarer rather than multiple case squarers. In further embodiments, the case squarers are configured such that the squaring components pivot upward or downward (such as about generally horizontal pivot axes) after the case triggers the sensor. In other embodiments, the case-squaring assembly includes only one actuator operably coupled to both squaring components to simultaneously move both squaring components to their case-passage positions.

What is claimed is:

1. A method of operating a case former, the method comprising:

after a case in an upright orientation in which upper minor and major flaps of the case extend upwardly has been received by a case mover, and after bottom minor flaps of the case are closed, moving the case mover from a rest position toward a delivery position so the case in the upright orientation and with open bottom major flaps contacts a squaring component of a case squarer; and continue moving the case mover toward the delivery position with the case in the upright orientation to manipulate the case into having a rectangular cross-section and thereafter closing the bottom major flaps of the case.

2. The method of claim 1, wherein the case comprises four walls and the bottom major and minor flaps are connected to the four walls, wherein the case has the rectangular cross-section when the interior angles formed between adjacent walls of the case are within two degrees of ninety degrees.

3. The method of claim 1, further comprising, responsive to a sensor being triggered, moving the squaring component of the case squarer from a squaring position to a case-passage position.

4. The method of claim 3, wherein movement of the case to a designated position triggers the sensor.

5. The method of claim 4, wherein the sensor is triggered upon the sensor detecting the case.

6. The method of claim 4, wherein the sensor is triggered upon the sensor detecting something other than the case.

7. The method of claim 4, wherein the sensor is positioned downstream of the squaring component of the case squarer.

8. The method of claim 1, further comprising, the case mover and the squaring component of the case squarer simultaneously engaging opposite end walls of the case.

9. The method of claim 1, further comprising, the case mover applying pressure to the case to cause the squaring component of the case squarer to rotate toward a case passage position.

10. The method of claim 1, wherein the case squarer is positioned downstream of minor bottom flap closers and upstream of major flap closers.

11. A method of operating a case former, the method comprising:

closing bottom minor flaps of a case;

after the bottom minor flaps are closed, and with the case in an upright orientation in which upper minor and major flaps of the case extend upwardly, moving the case into engagement with a squaring component of a case squarer to square the case;

moving the squaring component from a squaring position to a case-passage position; and with the case in the upright orientation, moving the case past the squaring component and closing bottom major flaps of the case.

12. The method of claim 11, further comprising, the squaring component at least partially blocking an area where the major bottom flaps of the case are closed.

13. The method of claim 11, further comprising, the case partially moving the squaring component from the squaring position to the case-passage position.

14. The method of claim 13, further comprising, a case-squarer actuator partially moving the squaring component from the squaring position to the case-passage position.

15. The method of claim 11, further comprising, a case-squarer actuator moving the squaring component from the squaring position to the case-passage position.

16. A method of operating a case former, the method comprising:

after closing bottom minor flaps of a case, and with the case in an upright orientation in which the upper minor and major flaps extend upwardly, moving the case into engagement with first and second squaring components of a case squarer to square the case;

moving each of the first and second squaring components from a squaring position to a case-passage position; and with the case in the upright orientation, moving the case between the first and second squaring components and closing major bottom flaps of the case.

17. The method of claim 16, further comprising, the first and second squaring components at least partially blocking an area where the major bottom flaps of the case are closed.

18. The method of claim 16, further comprising, the case partially moving the first and second squaring components from the squaring positions to the case-passage positions.

19. The method of claim 18, further comprising, first and second case-squarer actuators partially moving the first and second squaring components from the squaring positions to the case-passage positions.

20. The method of claim 16, further comprising, first and second case-squarer actuators moving the first and second squaring components from the squaring positions to the case-passage positions.

21. A method of operating a case former, the method comprising:

after a case has been received by a case mover and after bottom minor flaps of the case are closed, moving the case mover from a rest position toward a delivery position so the case with open bottom major flaps contacts a squaring component of a case squarer and such that the case mover applies pressure to the case to cause the squaring component of the case squarer to rotate toward a case passage position; and continue moving the case mover toward the delivery position to manipulate the case into having a rectangular cross-section and thereafter closing the bottom major flaps of the case.

22. A method of operating a case former, the method comprising:

after a case has been received by a case mover and after bottom minor flaps of the case are closed, moving the case mover from a rest position toward a delivery position so the case with open bottom major flaps contacts a squaring component of a case squarer, wherein the case squarer is positioned downstream of minor bottom flap closers and upstream of major flap closers; and continue moving the case mover toward the delivery position to manipulate the case into having a rectangular cross-section and thereafter closing the bottom major flaps of the case.

23. A method of operating a case former, the method comprising:

closing bottom minor flaps of a case;

moving the case with the closed minor flap into engagement with a squaring component of a case squarer to square the case;

moving the squaring component from a squaring position to a case-passage position which comprises the case partially moving the squaring component from the squaring position to the case-passage position; and moving the case past the squaring component and closing bottom major flaps of the case.

24. The method of claim 23, further comprising, a case-squarer actuator partially moving the squaring component from the squaring position to the case-passage position.

25. A method of operating a case former, the method comprising:

moving a case with closed bottom minor flap into engagement with first and second squaring components of a case squarer to square the case;

moving each of the first and second squaring components from a squaring position to a case-passage position which comprises the case partially moving the first and second squaring components from the squaring positions to the case-passage positions; and moving the case between the first and second squaring components and closing major bottom flaps of the case.

26. The method of claim 25, further comprising, first and second case-squarer actuators partially moving the first and second squaring components from the squaring positions to the case-passage positions.

* * * * *